March 25, 1924.
F. A. ANDERSON
ADJUSTABLE LOCKING JOINT
Filed Jan. 31, 1921
1,488,224
2 Sheets-Sheet 1
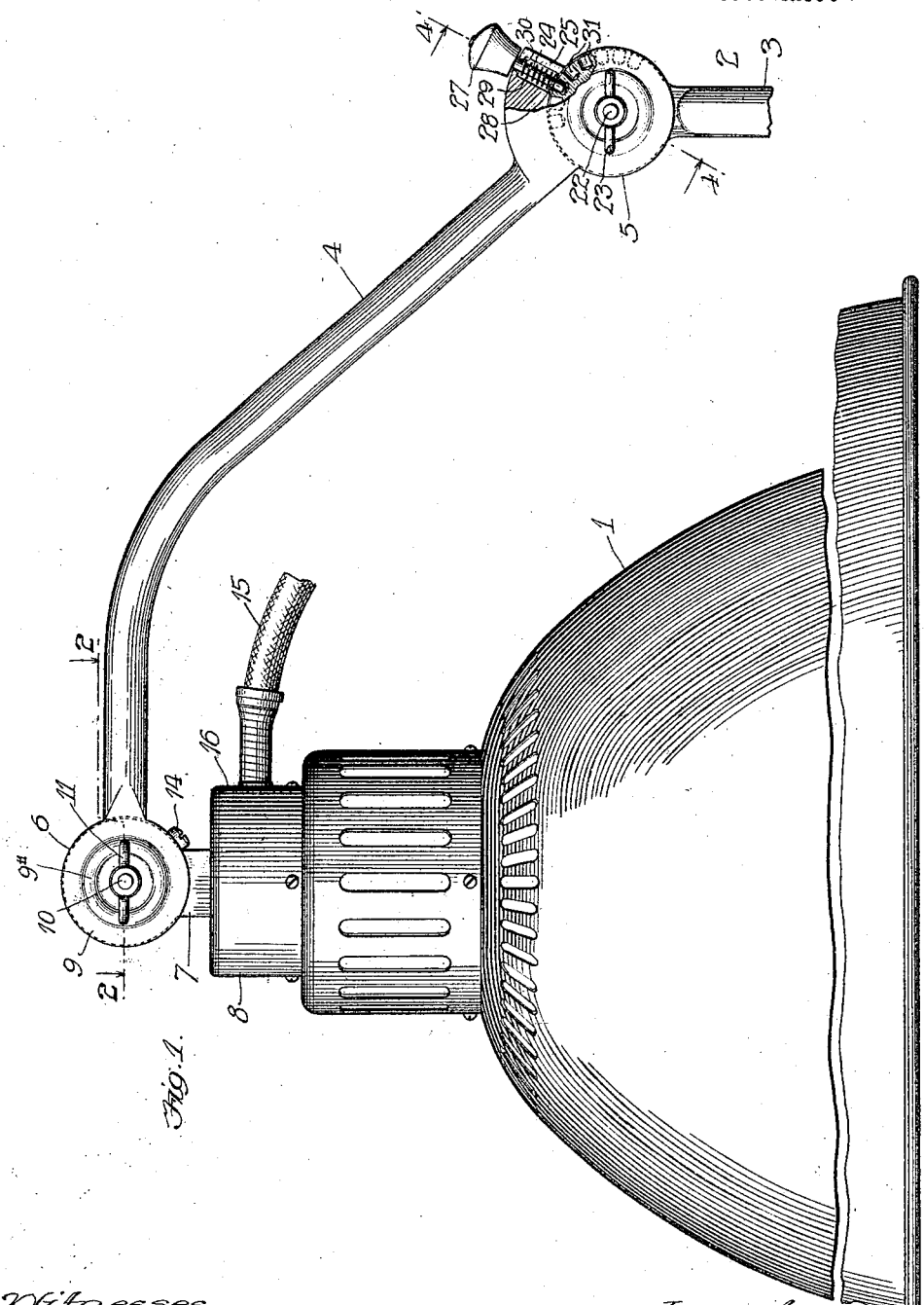
Witnesses
Martin H. Olsen.
Fred M. Davis
Inventor
Fritz A. Anderson.
By Rummler & Rummler Attys March 25, 1924.
F. A. ANDERSON
ADJUSTABLE LOCKING JOINT
Filed Jan. 31, 1921
2 Sheets-Sheet 2
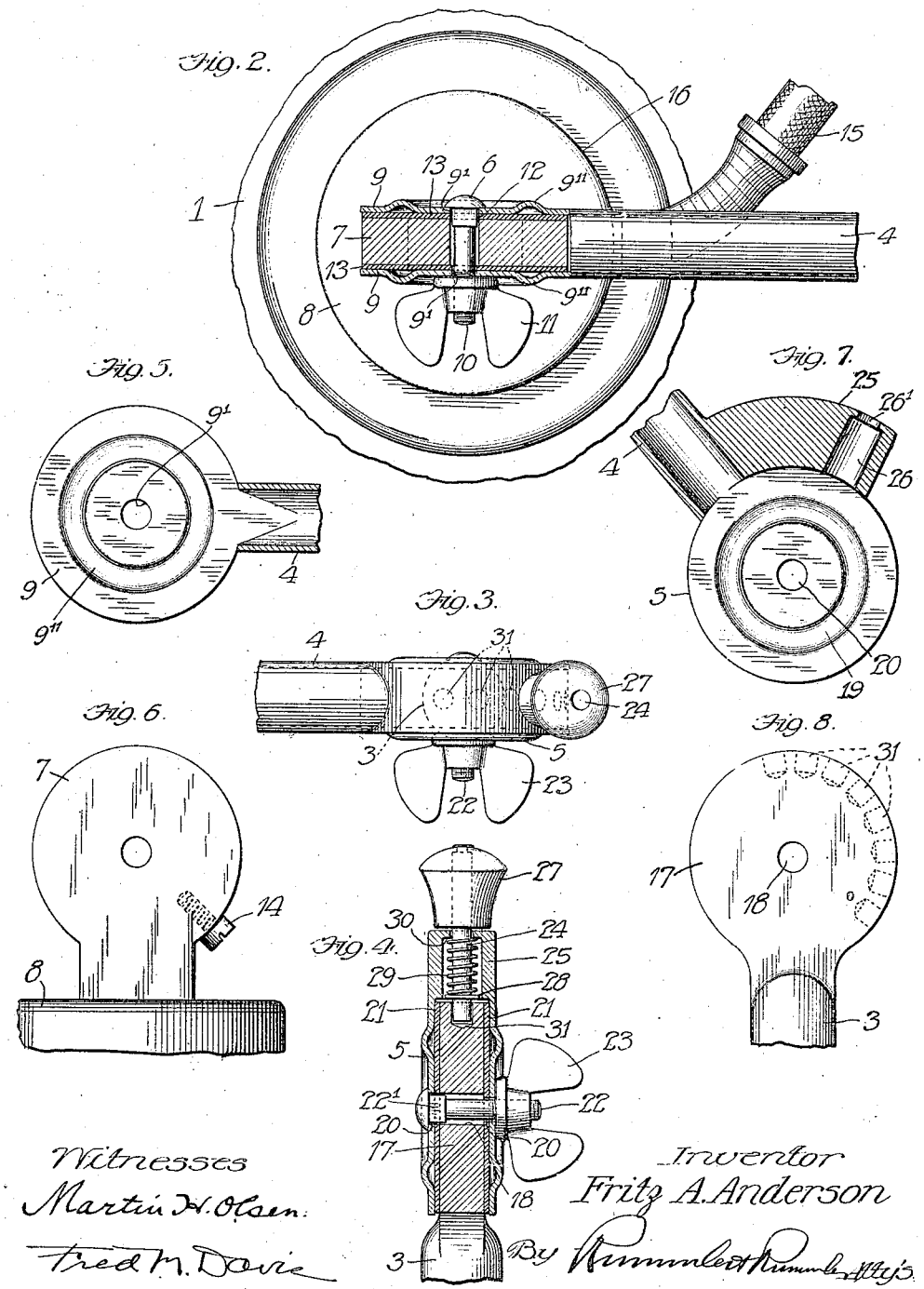
Witnesses
Martin H. Olsen
Fred M. Davis
Inventor
Fritz A. Anderson Patented Mar. 25, 1924.

1,488,224

UNITED STATES PATENT OFFICE.

FRITZ A. ANDERSON, OF MILTON, WISCONSIN, ASSIGNOR TO BURDICK CABINET CO., OF MILTON, WISCONSIN, A CORPORATION OF WISCONSIN.

ADJUSTABLE LOCKING JOINT.

Application filed January 31, 1921. Serial No. 441,335.

*To all whom it may concern:*

Be it known that I, FRITZ A. ANDERSON, a citizen of the United States of America, and a resident of Milton, county of Rock, and State of Wisconsin, have invented certain new and useful improvements in Adjustable Locking Joints, of which the following is a specification.

This invention relates mainly to hinge joints adapted for adjustable setting and especially to the fastening means therefor, particular reference being had to the supporting brackets or standards for therapy lamp outfits. The main objects of the invention are to provide an improved form of adjustable hinge joint and locking means therefor; to provide duplex fastening means adapted to insure against accidental swinging of the lamp and free arm by gravity incident to making a change in the setting; to provide such means adapted to effect ready trial settings of comparatively non-rigid character, followed by an ultimate setting of high rigidity; to provide such a lock having positive means to prevent accidental relative displacement or swinging of either of the joint connected objects except when definitely released and held open by the attendant; and to provide such a joint of simple and efficient form adapted in the main to be constructed integrally with and to connect a pair of tubular arms or bars.

An illustrative embodiment of this invention is shown in the accompanying drawings, in which—

Figure 1 is a side view of a therapeutic lamp and bracket, parts of which are broken away, but the free arm and associated joints illustrating this invention being shown.

Fig. 2 is a horizontal section on the line 2—2 of Fig. 1.

Fig. 3 is a plan of the bracket joint shown at the right hand side of Fig 1.

Fig. 4 is a section on the line 4—4 of Fig. 1.

Fig. 5 is an inner face view of the upper outside joint member shown in Fig. 2, with part of the arm in section.

Fig. 6 is a side view of the uppermost part of the lamp socket and the corresponding hinge member thereon substantially as shown in Fig. 1 but with the supporting bracket and locking means removed.

Fig. 7 is a detail of the right hand joint of Fig. 1 and shows an inner face view of the rear hinge plate of the bracket arm with the adjacent part of the arm in vertical section.

Fig. 8 is a side view of the upper end of the lower member or standard of the bracket with the arm pivot bolt and clamping nut removed.

In the construction shown in the drawings, the lamp 1 is supported by the adjustable floor stand or bracket 2, only the upper part of which is shown. Said bracket comprises an upright main body part or column 3 and a laterally projecting arm 4 adjustably hinged thereto at 5. Said lamp 1 is adjustably hinged to the free end of the arm 4 as by the joint shown at 6.

The joint 6 is of hinge-like interdigitating character and comprises the bifurcated end of the bracket arm 4 in combination with a tongue member 7 rigid with the lamp socket 8 and fitting between the flat arms or sides 9 of the forked member 4, a pivot consisting of a clamping bolt 10 being positioned in holes 9' axially of said members whereon they are relatively swingable. Said pivot 10 is in the form of a carriage bolt and is provided with a manually adjustable fastening preferably in the form of a wing nut 11. The square head of said bolt fits snugly in a correspondingly formed aperture therefor as shown at 12. The said sides 9 are corrugated somewhat as at 9'' concentrically with their main axis and the bolt 10.

Washer members 13 may to advantage be positioned adjacent to the tongue 7 on each side and may be secured rigidly thereto, said washers being of friction metal and being adapted to enhance the security of the joint when set in any desired position.

A stop 14 in the form of a set screw is provided on the back side of tongue 7 to limit the inward swing of the lamp, so as to protect the shade when the arm 4 is elevated and the lamp swung toward the standard 3.

The method of adjusting said joint 6 is to loosen the nut 11, thus releasing the friction grip, and then swing the lamp 1 either toward or away from the column 3 as may be desired. The nut 11 is then set manually as will be understood.

The cable 15 contains conductors for lighting current and is disposed beneath the arm 4. It is connected to the spun metal socket casing 16 as best shown in Fig. 1.

The joint 5 embodies all of the main features of joint 6, in substantially the same form as shown at the point where the lamp connects to the arm 4, together with certain additional features now to be described.

The upper end of the standard 3 is provided with a flat disk-shaped tongue 17 centrally apertured at 18 and the arm 4 at the corresponding end is provided with a pair of fork branches 19 apertured at 20 and spaced apart sufficiently to receive the tongue 17 snugly between them with friction washers 21 disposed immediately between tongue 17 and the disk-shaped fork members 19. The pivot 22 of this joint is in the form of a stove bolt provided with a wing nut 23 substantially as described in connection with joint 6. The square end 22' of bolt 22 fits in a square perforation in one of the branches 19. Washers 21 may be fixed rigidly with the tongue 17.

In order to secure this joint against sudden and unintended movement, as might result from gravity operating on the lamp when the nut 23 is loosened, supplementary locking means are provided in connection with the above mentioned parts, comprising a spring actuated dog or plunger 24. This plunger is mounted on a frame extension 25 formed on the upper back side of arm 4 at its stationary end. Said extension contains a radial aperture 26 entirely open at its inner end and having a restricted opening 26' at its outer end. The plunger 24 includes a shaft fitting loosely in the restricted outer opening and a handle 27 adapted for ready gripping for manual operation by pulling outwardly. A shoulder 28 is provided on said plunger near its inner end and a spiral spring 29 is placed in compression between said shoulder and the inwardly facing shoulder 30 surrounding the said restricted aperture whereby said plunger is normally urged inwardly to engage the edge of tongue 17 of standard 3. Said tongue is provided with a series of radially disposed apertures 31 along the rim of the periphery of said tongue which passes under said plunger as the arm 4 swings through its range of movement. By reason of said spring, the plunger normally engages some one or another of said apertures positively, thereby preventing any substantial movement of arm 4, as by gravity, until the plunger 24 is withdrawn manually.

In order to operate this joint 5 the nut 23 is first loosened and then with one hand supporting the arm 4 or lamp carried thereby the plunger is withdrawn by the other hand, whereupon the arm 4 may be swung to any position desired. The arm is then locked in place first by releasing the plunger and then by setting the nut 23, the latter serving to make the joint absolutely rigid, whereas the plunger alone would leave some degree of looseness.

It is to be noted that the friction washer members 13 of joint 6 may be stamped together as an integral piece from sheet metal. The same is true as to the friction washers 21 for joint 5.

Although but one specific embodiment of this invention as a whole is herein shown and described, it is to be understood that some of the details of the construction shown may be altered or omitted without departing from the spirit of this invention as defined by the following claim.

I claim:

In a device of the character described a pair of members hinged together, one of said members having a tongue with friction washers disposed adjacent thereto and the other member having a pair of arms embracing said tongue and the washers thereon, a pivot bolt provided with a wing nut for manually turning, said bolt having a head formed to interlock non-turnably with respect to the adjacent arm.

Signed at Milton, Wis., this 20th day of Jan., 1921.

FRITZ A. ANDERSON.